US012565587B2

(12) United States Patent
Pecinovsky et al.

(10) Patent No.: US 12,565,587 B2
(45) Date of Patent: Mar. 3, 2026

(54) NONLINEAR OPTICAL CHROMOPHORES HAVING SHORT-CHAIN BRIDGE STRUCTURES, LOW OPTICAL LOSS MATERIALS CONTAINING THE SAME, AND METHODS FOR PREPARING THE SAME

(71) Applicant: Lightwave Logic, Inc., Englewood, CO (US)

(72) Inventors: Cory Pecinovsky, Lafayette, CO (US); Barry Johnson, Castle Rock, CO (US); Ginelle A. Ramann, Centennial, CO (US); Baoquan Chen, Lone Tree, CO (US)

(73) Assignee: Lightwave Logic, Inc., Englewood, CO (US)

( * ) Notice: Subject to any disclaimer, the term of this patent is extended or adjusted under 35 U.S.C. 154(b) by 628 days.

(21) Appl. No.: 18/084,095

(22) Filed: Dec. 19, 2022

(65) Prior Publication Data

US 2023/0212399 A1 Jul. 6, 2023

Related U.S. Application Data

(60) Provisional application No. 63/296,579, filed on Jan. 5, 2022.

(51) Int. Cl.
*C09B 23/01* (2006.01)
*G02F 1/361* (2006.01)

(52) U.S. Cl.
CPC ........ *C09B 23/0075* (2013.01); *G02F 1/3612* (2013.01)

(58) Field of Classification Search
CPC ..................................................... G02F 1/3612
See application file for complete search history.

(56) References Cited

U.S. PATENT DOCUMENTS

| | | | |
|---|---|---|---|
| 4,767,169 | A | 8/1988 | Teng et al. |
| 4,795,664 | A | 1/1989 | Demartino |
| 4,810,338 | A | 3/1989 | Demartino et al. |
| 4,936,645 | A | 6/1990 | Yoon et al. |
| 5,006,285 | A | 4/1991 | Thackara et al. |
| 5,044,725 | A | 9/1991 | Demartino et al. |

(Continued)

FOREIGN PATENT DOCUMENTS

| | | | |
|---|---|---|---|
| WO | 0009613 | A2 | 2/2000 |

OTHER PUBLICATIONS

Nemoto, et al., A New Class of Second-Order Non-Linear Optical Material: Stilbazolium Benzimidazolate Derived From Alkylsulfonyl Substituted Stilbazole, Journal of Materials Chemistry, Royal Society of Chemistry, vol. 8, No. 5, p. 1193-1197 (May 1, 1998).

(Continued)

*Primary Examiner* — Peter F Godenschwager
(74) *Attorney, Agent, or Firm* — Flaster Greenberg P.C.

(57) ABSTRACT

Nonlinear optical chromophores are provided that have a short chain bridging group between donor and acceptor, which chromophores exhibit lowered $\lambda_{max}$ values and narrow absorption bands. Electro-optic films prepared from nonlinear optical chromophores provided have enhanced transparency to wavelengths outside of the narrow absorption bands, as well as low optic loss, high thermal stability, and high photostability.

13 Claims, 8 Drawing Sheets

(56) References Cited

U.S. PATENT DOCUMENTS

| | | | |
|---|---|---|---|
| 5,106,211 | A | 4/1992 | Chiang et al. |
| 5,133,037 | A | 7/1992 | Yoon et al. |
| 5,170,461 | A | 12/1992 | Yoon et al. |
| 5,187,234 | A | 2/1993 | Leslie et al. |
| 5,196,509 | A | 3/1993 | Allen |
| 5,247,042 | A | 9/1993 | Allen et al. |
| 5,326,661 | A | 7/1994 | Sansone et al. |
| 5,670,091 | A | 9/1997 | Marder et al. |
| 5,679,763 | A | 10/1997 | Jen et al. |
| 6,090,332 | A | 7/2000 | Marder et al. |
| 6,393,190 | B1 | 5/2002 | He et al. |
| 6,444,830 | B1 | 9/2002 | He et al. |
| 6,448,416 | B1 | 9/2002 | He et al. |
| 6,514,434 | B1 | 2/2003 | He et al. |
| 6,584,266 | B1 | 6/2003 | He et al. |
| 6,716,995 | B2 | 4/2004 | Huang et al. |
| 2007/0208182 | A1 | 9/2007 | Kay |
| 2007/0260062 | A1 | 11/2007 | Goetz et al. |
| 2007/0260063 | A1 | 11/2007 | Goetz et al. |
| 2008/0009620 | A1 | 1/2008 | Goetz et al. |
| 2008/0139812 | A1 | 6/2008 | Goetz et al. |
| 2009/0005561 | A1 | 1/2009 | Goetz et al. |
| 2012/0267583 | A1 | 10/2012 | Goetz, Jr. et al. |
| 2016/0062211 | A1 | 3/2016 | Kaneko et al. |
| 2020/0183245 | A1 | 6/2020 | Yi et al. |
| 2021/0405504 | A1 | 12/2021 | Pecinovsky et al. |

OTHER PUBLICATIONS

Chia-Chi Teng, Measuring Electro-Optic Constants of a Poled Film, in Nonlinear Optics of Organic Molecules and Polymers, Chp. 7, at 447-49 (Hari Singh Nalwa & Seizo Miyata eds., 1997).

C. W. Thiel, “For-wave Mixing and Its Applications,” http://www.physics.montana.edu.students.thiel.docs/FWMixing.pdf, 2008, at 1-20.

NONLINEAR OPTICAL CHROMOPHORES HAVING SHORT-CHAIN BRIDGE STRUCTURES, LOW OPTICAL LOSS MATERIALS CONTAINING THE SAME, AND METHODS FOR PREPARING THE SAME

CROSS-REFERENCE TO RELATED APPLICATIONS

This application claims the benefit of U.S. Provisional Patent Application No. 63/296,579, filed Jan. 5, 2022, the entire contents of which are hereby incorporated herein by reference.

BACKGROUND OF THE INVENTION

Nonlinear optical (NLO) chromophores provide the electro-optic (EO) activity in poled, electro-optic polymer devices. Electro-optic polymers have been investigated for many years as an alternative to inorganic materials such as lithium niobate in electro-optic devices. Electro-optic devices may include, for example, external modulators for telecom, datacom, RF photonics, and optical interconnects and so forth. Polymeric electro-optic materials have demonstrated enormous potential for core application in a broad range of next-generation systems and devices, including electro-optic modulators, optical switches, phased array radar, satellite and fiber telecommunications, cable television (CATV), optical gyroscopes for application in aerial and missile guidance, electronic counter measure (ECM) systems, backplane interconnects for high-speed computation, ultraquick analog-to-digital conversion, land mine detection, radio frequency photonics, spatial light modulation and all-optical (light-switching-light) signal processing.

Many NLO molecules (chromophores) have been synthesized that exhibit high molecular electro-optic properties. The product of the molecular dipole moment ($\mu$) and hyperpolarizability ($\beta$) is often used as a measure of molecular electro-optic performance due to the dipole's involvement in material processing. See Dalton et al., "New Class of High Hyperpolarizability Organic Chromophores and Process for Synthesizing the Same", WO 00/09613.

Nevertheless, extreme difficulties have been encountered translating microscopic molecular hyperpolarizabilities ($\beta$) into macroscopic material hyperpolarizabilities ($\chi^2$). Molecular subcomponents (chromophores) must be integrated into NLO materials that exhibit (i) a high degree of macroscopic nonlinearity and (ii) sufficient temporal, thermal, chemical and photochemical stability. High electro-optic activity and the stability of electro-optic activity, which is also referred to as "temporal stability," are important for commercially viable devices. Electro-optic activity may be increased in electro-optic polymers by increasing the concentration of nonlinear optical chromophores in a host polymer and by increasing of the electro-optic property of chromophores. However, some techniques for increasing chromophore concentration may decrease poling efficiency and temporal stability. Simultaneous solution of these dual issues is regarded as the final impediment in the broad commercialization of EO polymers in numerous devices and systems.

The production of high material hyperpolarizabilities ($\chi^2$) is limited by the poor social character of NLO chromophores. Commercially viable materials must incorporate chromophores at large molecular densities with the requisite molecular moment statistically oriented along a single material axis. In order to achieve such an organization, the charge transfer (dipole) character of NLO chromophores is commonly exploited through the application of an external electric field during material processing that creates a localized lower-energy condition favoring noncentrosymmetric order. Unfortunately, even at moderate chromophore densities, molecules form multi-molecular dipolarly-bound (centrosymmetric) aggregates that cannot be dismantled via realistic field energies. To overcome this difficulty, integration of anti-social dipolar chromophores into a cooperative material architecture is commonly achieved through the construction of physical barriers (e.g., anti-packing steric groups) that limit proximal intermolecular relations.

Thus, it has often been considered advantageous in the art to produce nonlinear optical chromophore containing materials that exhibit a high glass transition temperature (Tg). Materials with a high glass transition temperature exhibit improved thermal stability and maintain their macroscopic electro-optic properties to a greater degree than materials with lower glass transition temperatures. It can also be advantageous to produce nonlinear optical chromophores which exhibit desirable macroscopic optical properties, thermal stability and have lower wavelength maximum absorption, i.e $\lambda_{max}$.

BRIEF SUMMARY OF THE INVENTION

The present invention is directed, in general, to nonlinear optical chromophores having a short chain bridging group between donor and acceptor. Various embodiments of the present invention include nonlinear optical chromophores having a short chain bridging group between donor and acceptor, which chromophores exhibit lowered $\lambda_{max}$ values. Various embodiments of the present invention include nonlinear optical chromophores having a short chain bridging group between donor and acceptor in a polar solvent, which chromophores exhibit $\lambda_{max}$ values less than or equal to 800 nm. In some examples, nonlinear optical chromophores exhibit $\lambda_{max}$ values less than or equal to 750 nm. In other examples, nonlinear optical chromophores exhibit $\lambda_{max}$ values less than or equal to 700 nm, less than or equal to 650 nm, or less than or equal to 600 nm. In certain embodiments, nonlinear optical chromophores having a short chain bridging group between donor and acceptor, which chromophores exhibit lowered $\lambda_{max}$ values, can have narrow absorption bands of, e.g., ~30-800 nm or less at $\lambda_{max}$. In example embodiments, nonlinear optical chromophores can have narrow absorption bands of ~30-100 nm or less at $\lambda_{max}$. In certain other embodiments nonlinear optical chromophores are characterized by a $\Delta\lambda_{max}$ based $\lambda_{max}$ of chromophore analogs in a nonpolar solvent.

$\lambda_{max}$ values of the embodiments described herein create a larger transparency range among large wavelengths than do $\lambda_{max}$ values outside of the ranges described herein For example, various nonlinear optical chromophore embodiments provide transparency over 800 nm, which have applications in 1) short-distance local area networks, 2) free-space optical fiber communications and optical interconnection in conjunction with LED or semiconductor lasers, and 3) active materials for terahertz (THz) applications. Various embodiments of the present invention include nonlinear optical chromophores having a short chain bridging group between donor and acceptor, which chromophores exhibit decreased optical loss and can provide higher degree of transparency at various wavelengths. In addition, various embodiments of the present invention have optimized characteristics of (1) higher $r_{33}$ (electro-optic coefficients) at various wavelengths, (2) higher $T_g$ (glass transition temperature), (3) exceptionally high thermal stability, and (4) high photostability.

Various embodiments of the present invention include a nonlinear optical chromophore of the general formula (I):

$$D\text{-}\Pi\text{-}A \quad (I)$$

wherein D represents an organic electron-donating group; A represents an organic electron-accepting group having an electron affinity greater than the electron affinity of D; and Π represents a Π-bridge between A and D; wherein the Π-bridge comprises a carbon chain covalently bound to and separating A and D, wherein the carbon chain length between A and D is 2 to 4 carbon atoms, and wherein the 2 to 4 carbon atom chain comprises up to 2 carbon-carbon double bonds and up to 4 pendant substituents, wherein two or more of the pendant substituents can form a ring structure with the 2 to 4 carbon atom chain.

Various embodiments of the present invention include a nonlinear optical chromophore of the general formula ($I^a$):

($I^a$)

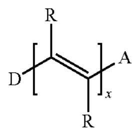

wherein D represents an organic electron-donating group; A represents an organic electron-accepting group having an electron affinity greater than the electron affinity of D; x is 1 or 2; and wherein each R independently represents a hydrogen, an alkyl group, aryl group, sulfur or oxygen linked alkyl or aryl group, an aryl group (optionally bearing a diamondoid group) linked directly by a carbon-carbon bond (e.g., adamantyl anisole), a halogen, a halogenated alkyl group, a halogenated aryl group, a branched or unbranched, optionally heteroatom-containing $C_1$-$C_4$ substituent, or a diamondoid-containing group. In various embodiments, one or more R substituents can represent a moiety having 1 to 4 carbon atoms. In various embodiments, one or more R substituents can represent a thiophene moiety.

In various embodiments of the present invention, the electron-donating group includes a substituted or unsubstituted quinolinyl group. In various embodiments of the present invention, the Π-bridge includes a pendant thiophene-containing substituent.

In certain embodiments, a composition of nonlinear optic chromophores is provided for preparing an electro-optic film exhibiting one or more high optic characteristics in which the nonlinear optical chromophore exhibits a λmax value less than or equal to 800 nm and the one or more high optic characteristics is an electro-optic coefficient of the electro-optic film. In one example embodiment, the nonlinear optical chromophore is of the general formula (1) D-Π-A, where D represents an organic electron-donating group; A represents an organic electron-accepting group having an electron affinity greater than the electron affinity of D, Π represents a Π-bridge between A and D, wherein the Π-bridge comprises a carbon chain covalently bound to and separating A and D, wherein the carbon chain length between A and D is 2 to 4 carbon atoms, and wherein the 2 to 4 carbon atom chain comprises up to 2 carbon-carbon double bonds and up to 4 pendant substituents. In this and other examples, a high boiling point, aprotic, polar solvent may be used, in which the solvent adapted to promote high material hyperpolarizability in the electro-optic film.

Other aspects, features and advantages will be apparent from the following disclosure, including the detailed description, preferred embodiments, and the appended claims.

BRIEF DESCRIPTION OF SEVERAL VIEWS OF THE DRAWINGS

The foregoing summary, as well as the following detailed description of preferred embodiments of the invention, will be better understood when read in conjunction with the appended drawings. For purposes of illustration the invention, there are shown in the drawings embodiments which are presently preferred. It should be understood, however, that the invention is not limited to the precise arrangements and instrumentalities shown.

In the drawings:

Figure 1:
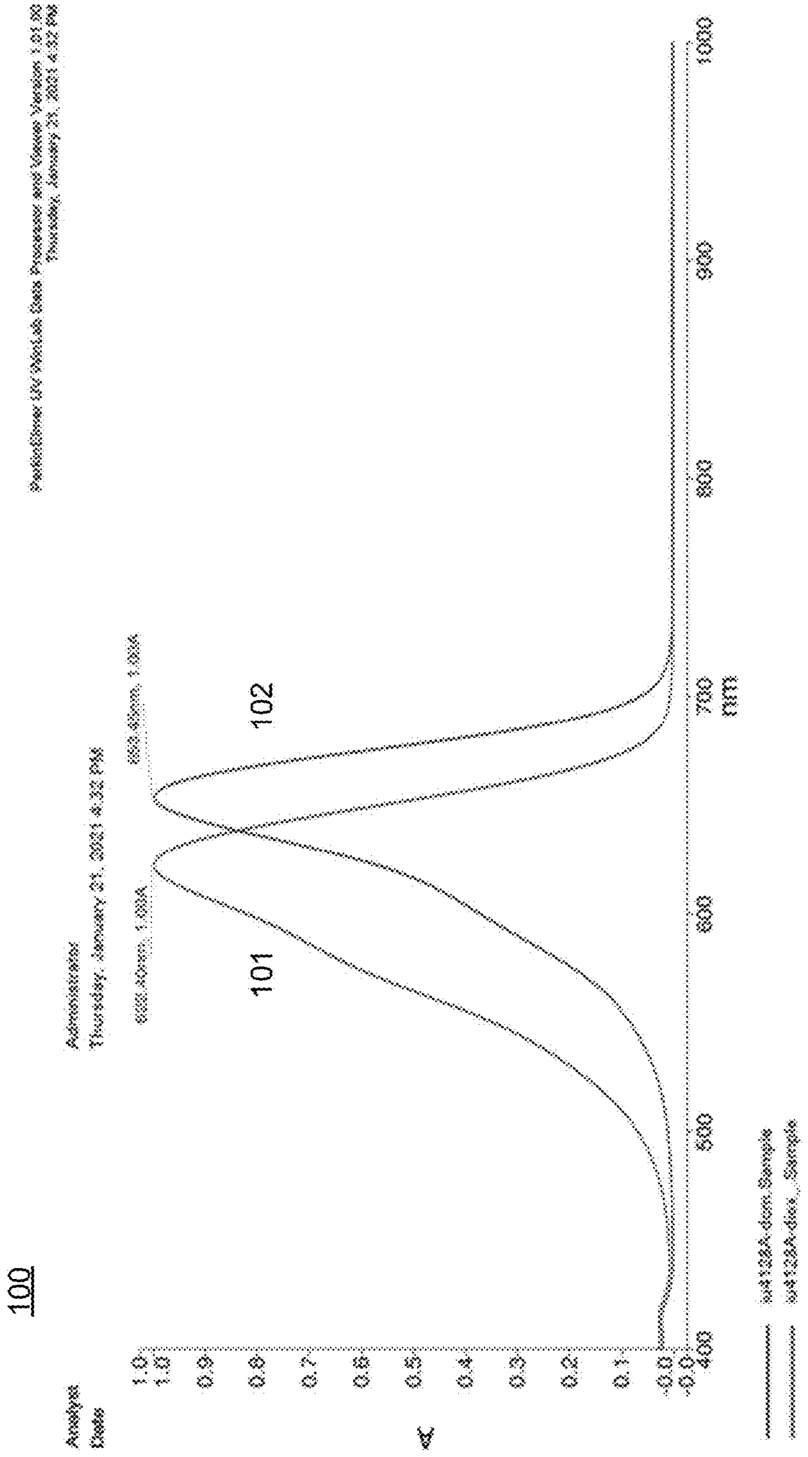

Spectrograph 100 of FIG. 1 illustrates the absorption of an example short chain bridge chromophore of Formula 1a in two different solvents over the UV-Vis spectrum, where first curve 101 shows the absorption of the example short chain bridge chromophore of Formula 1a in 1,4-dioxane solvent over the UV-Vis spectrum, whereas second curve 102 shows the absorption of the example short chain bridge chromophore of Formula 1a in dichloromethane (DCM) solvent over the UV-Vis spectrum.

Figure 2:
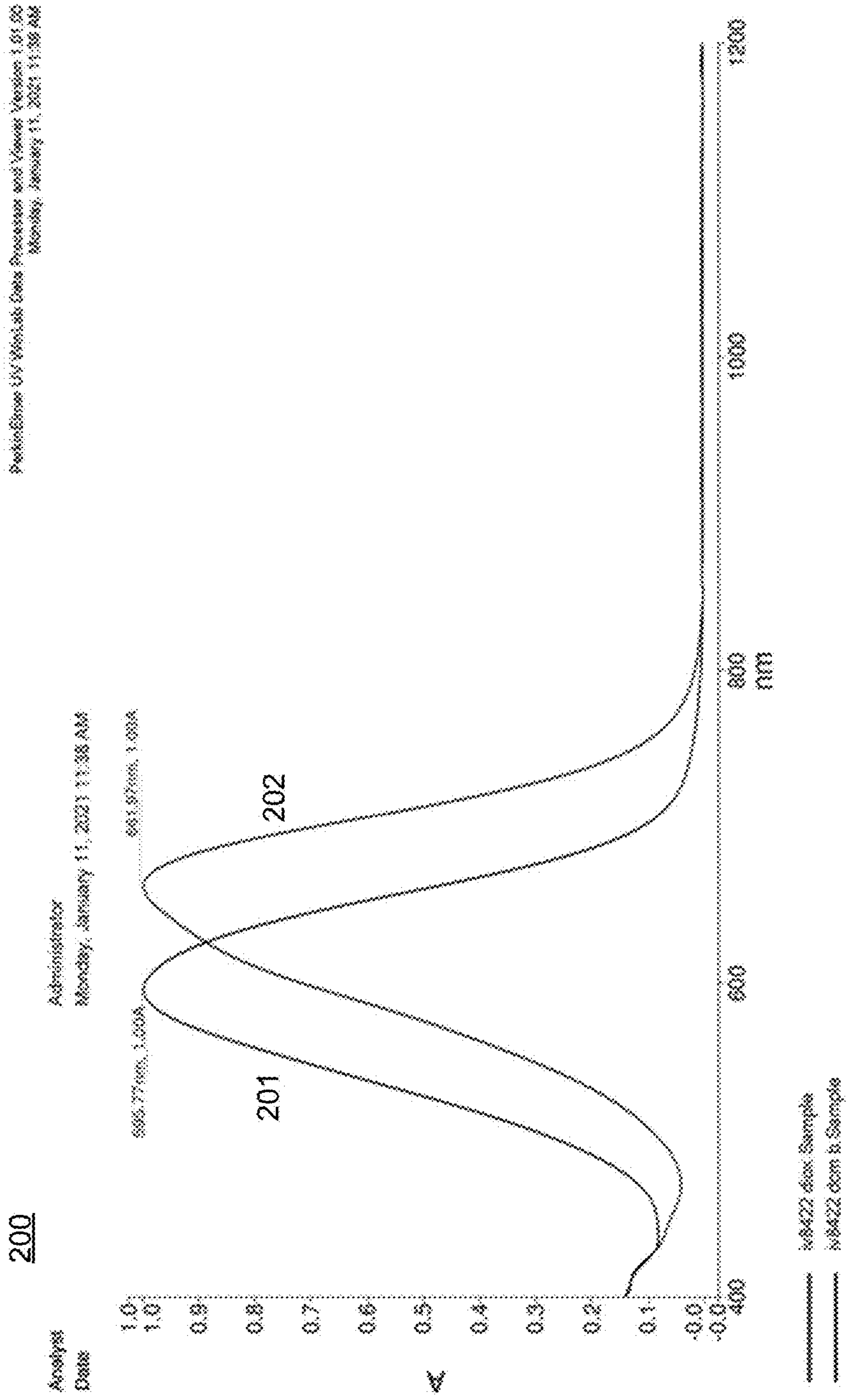

Spectrograph 200 of FIG. 2 illustrates the absorption of a second example short chain bridge chromophore of Formula 1a in two different solvents over the UV-Vis spectrum, where first curve 201 shows the absorption of the second example short chain bridge chromophore of Formula 1a in 1,4-dioxane solvent over the UV-Vis spectrum, whereas second curve 202 shows the absorption of the second example short chain bridge chromophore of Formula 1a in dichloromethane (DCM) solvent over the UV-Vis spectrum.

Figure 3:
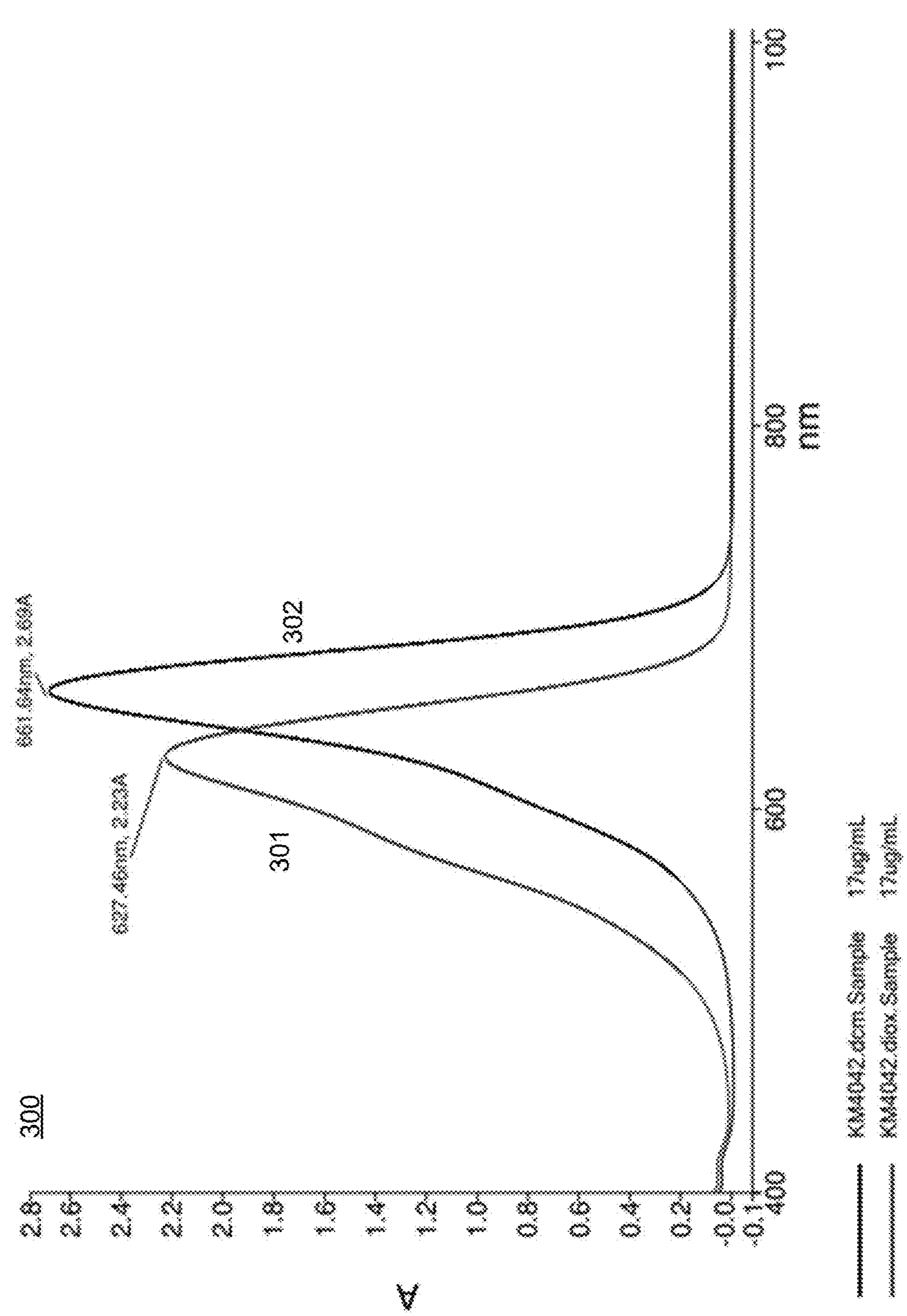

Spectrograph 300 of FIG. 3 illustrates the absorption of a third example short chain bridge chromophore of Formula 1a in two different solvents over the UV-Vis spectrum, where first curve 301 shows the absorption of the third example short chain bridge chromophore of Formula 1a in 1,4-dioxane solvent over the UV-Vis spectrum, whereas second curve 302 shows the absorption of the third example short chain bridge chromophore of Formula 1a in dichloromethane (DCM) solvent over the UV-Vis spectrum.

Figure 4:
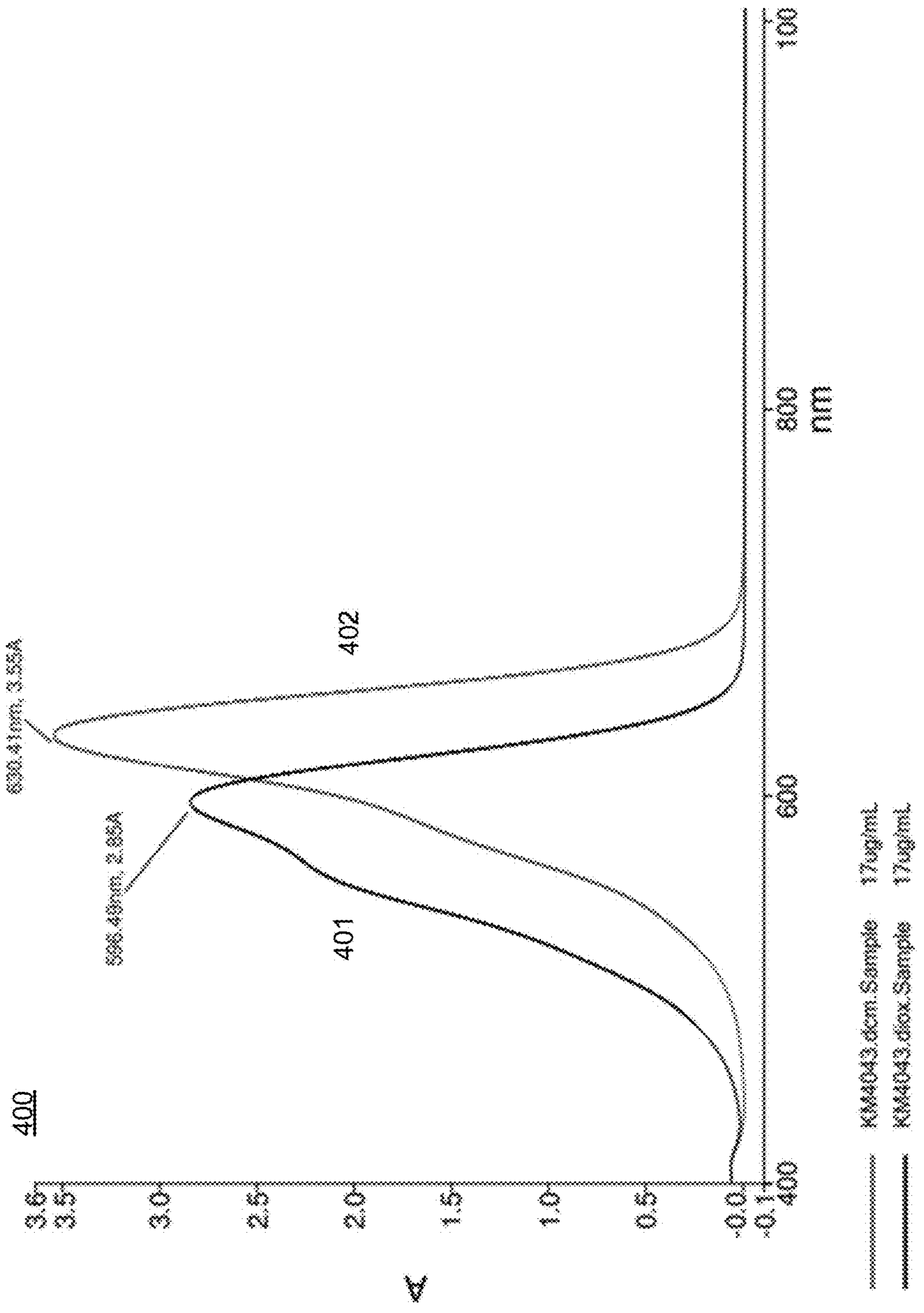

Spectrograph 400 of FIG. 4 illustrates the absorption of a fourth example short chain bridge chromophore of Formula 1a in two different solvents over the UV-Vis spectrum, where first curve 401 shows the absorption of the fourth example short chain bridge chromophore of Formula 1a in 1,4-dioxane solvent over the UV-Vis spectrum, whereas second curve 402 shows the absorption of the fourth example short chain bridge chromophore of Formula 1a in dichloromethane (DCM) solvent over the UV-Vis spectrum.

Figure 5:
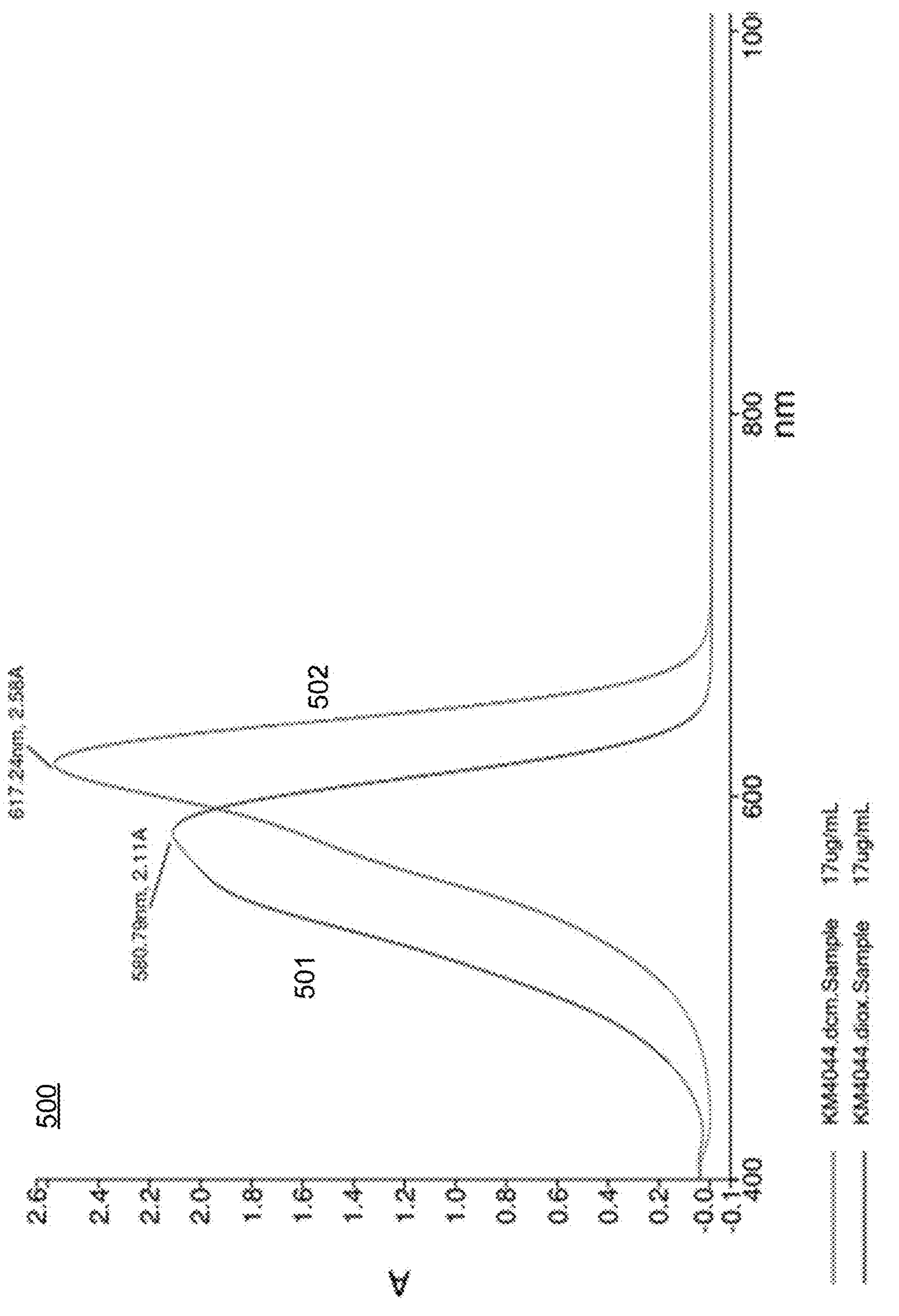

Spectrograph 500 of FIG. 5 illustrates the absorption of a fifth example short chain bridge chromophore of Formula 1a in two different solvents over the UV-Vis spectrum, where first curve 501 shows the absorption of the fifth example short chain bridge chromophore of Formula 1a in 1,4-dioxane solvent over the UV-Vis spectrum, whereas second curve 502 shows the absorption of the fifth example short chain bridge chromophore of Formula 1a in dichloromethane (DCM) solvent over the UV-Vis spectrum.

Figure 6:
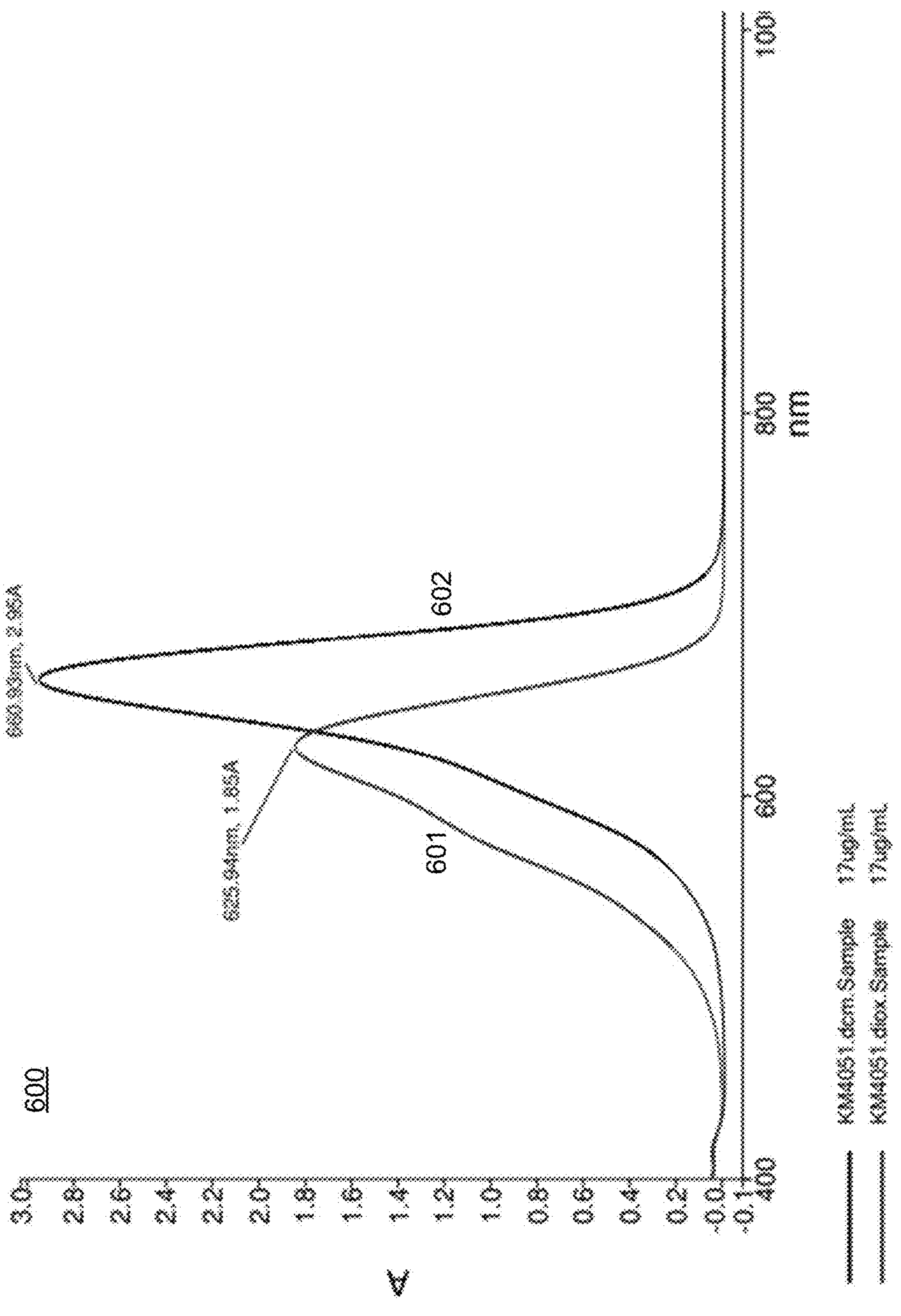

Spectrograph 600 of FIG. 6 illustrates the absorption of a sixth example short chain bridge chromophore of Formula 1a in two different solvents over the UV-Vis spectrum, where first curve 601 shows the absorption of the sixth example short chain bridge chromophore of Formula 1a in 1,4-dioxane solvent over the UV-Vis spectrum, whereas second curve 602 shows the absorption of the sixth example short chain bridge chromophore of Formula 1a in dichloromethane (DCM) solvent over the UV-Vis spectrum.

Figure 7:
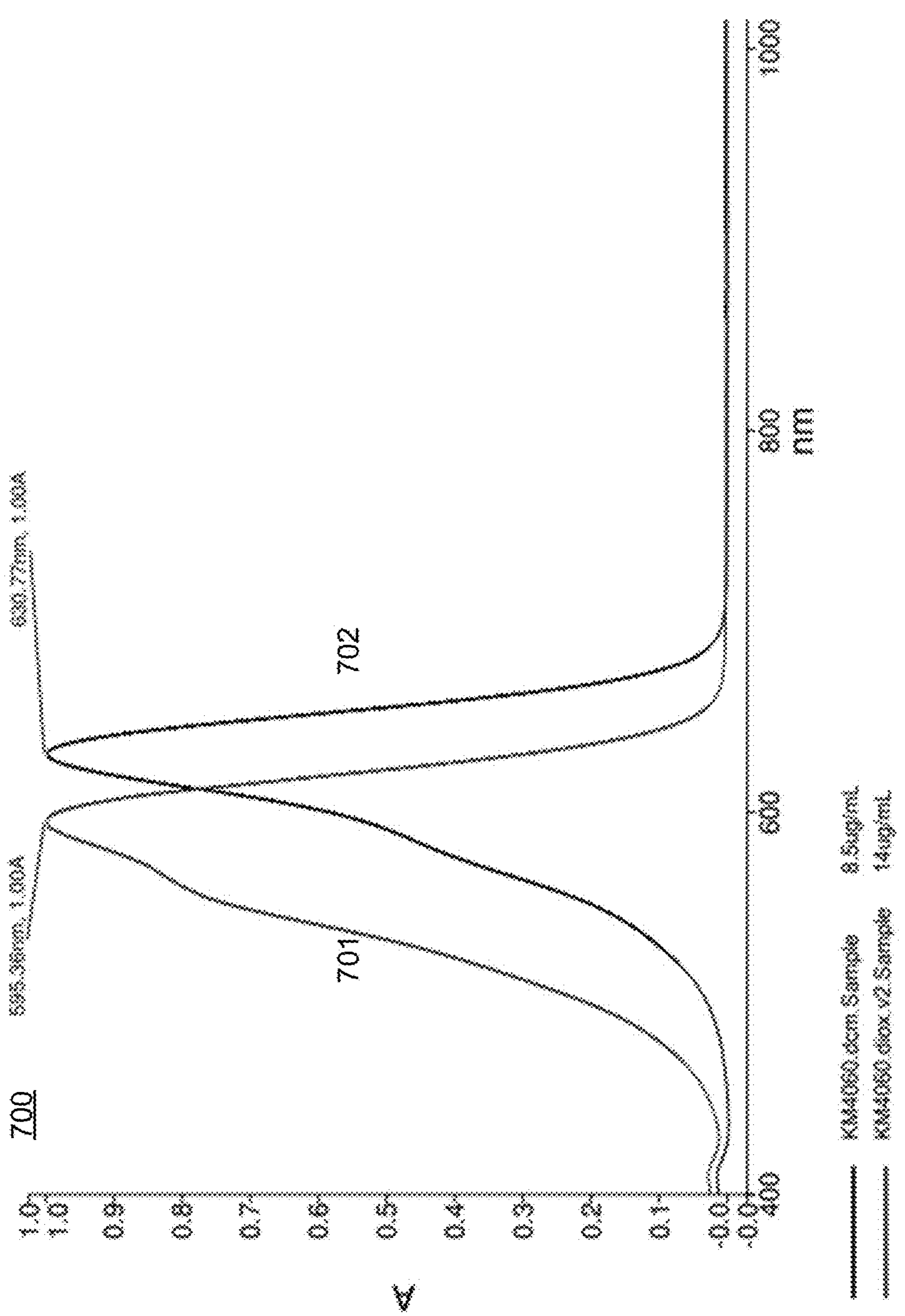

Spectrograph 700 of FIG. 7 illustrates the absorption of a seventh example short chain bridge chromophore of Formula 1a in two different solvents over the UV-Vis spectrum, where first curve 701 shows the absorption of the seventh example short chain bridge chromophore of Formula 1a in 1,4-dioxane solvent over the UV-Vis spectrum, whereas second curve 702 shows the absorption of the seventh example short chain bridge chromophore of Formula 1a in dichloromethane (DCM) solvent over the UV-Vis spectrum.

Figure 8:
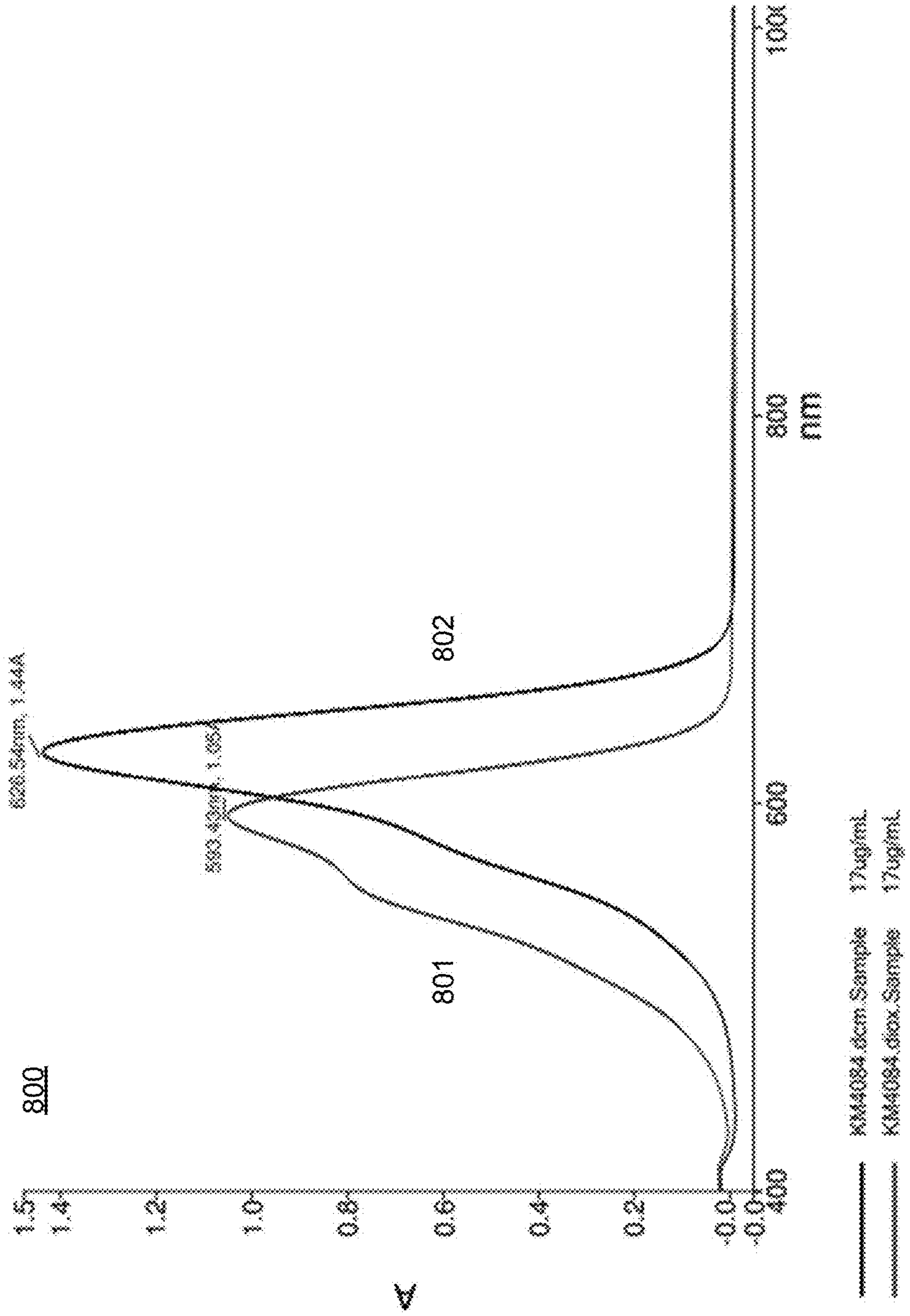

Spectrograph 800 of FIG. 8 illustrates the absorption of an eighth example short chain bridge chromophore of Formula 1a in two different solvents over the UV-Vis spectrum, where first curve 801 shows the absorption of the eighth example short chain bridge chromophore of Formula 1a in 1,4-dioxane solvent over the UV-Vis spectrum, whereas second curve 802 shows the absorption of the eighth example short chain bridge chromophore of Formula 1a in dichloromethane (DCM) solvent over the UV-Vis spectrum.

DETAILED DESCRIPTION OF THE INVENTION

As used herein, the singular terms "a" and "the" are synonymous and used interchangeably with "one or more" and "at least one," unless the language and/or context clearly indicates otherwise. Accordingly, for example, reference to "a polymer" or "the polymer" herein or in the appended claims can refer to a single polymer or more than one polymer. As a further example, reference to "a solvent" or "the solvent" herein or in the appended claims can refer to a single solvent or a mixture of more than one solvent. Additionally, all numerical values, unless otherwise specifically noted, are understood to be modified by the word "about."

As used herein, the term "nonlinear optic chromophore" (NLOC) refers to molecules or portions of a molecule that create a nonlinear optic effect when irradiated with light. The chromophores are any molecular unit whose interaction with light gives rise to the nonlinear optical effect. The desired effect may occur at resonant or nonresonant wavelengths. The activity of a specific chromophore in a nonlinear optic material is stated as its hyper-polarizability, which is directly related to the molecular dipole moment of the chromophore. The various embodiments of NLO chromophores of the present invention are useful structures for the production of NLO effects.

The first-order hyperpolarizability (β) is one of the most common and useful NLO properties. Higher-order hyperpolarizabilities are useful in other applications such as all-optical (light-switching-light) applications. To determine if a material, such as a compound or polymer, includes a nonlinear optic chromophore with first-order hyperpolar character and a sufficient electro-optic coefficient ($r_{33}$), which is a function of β, the following test may be performed. First, the material in the form of a thin film is placed in an electric field to align the dipoles. This may be performed by sandwiching a film of the material between electrodes, such as indium tin oxide (ITO) substrates, gold films, or silver films, for example.

Nonlinear optical chromophores of embodiments herein have a short chain bridging group between donor and acceptor, which chromophores exhibit lowered $\lambda_{max}$ values, can have narrow absorption bands of, e.g., ~50-800 nm or less at $\lambda_{max}$. For example, nonlinear optical chromophores having a short chain bridging group between donor and acceptor can have narrow absorption bands of ~50-100 nm or less at $\lambda_{max}$. As another example, nonlinear optical chromophores having a short chain bridging group between donor and acceptor can have narrow absorption bands of ~30-50 nm or less at $\lambda_{max}$.

The $\Delta\lambda_{max}$ is measured by calculating the $\lambda_{max}$ of the nonlinear optic chromophore in a standard polar solvent (e.g., DCM) versus the $\lambda_{max}$ an analog in a nonpolar solvent (e.g., 1,4-dioxane). The less-polar (1,4-dioxane) solvent will stabilize the neutral ground-state chromophore, while the more-polar solvent (DCM) will stabilize the charge-transfer state of the chromophore. The more easily the charge-transfer can happen, the more "polarizable", and hence the more active the chromophore. Here, it has been found that higher wavelengths are directly proportional to lower energy. So, the higher $\Delta\lambda_{max}$ between two solvents, the less energy is required to achieve the charge-transfer state. In addition, the $r_{33}$, which is measured experimentally and equates to the responsiveness of the light passing through to the electric field being applied, has a general correlation with the $\Delta\lambda_{max}$, wherein the larger $\Delta\lambda_{max}$ generally correlates to a larger $r_{33}$. In that manner, the $\Delta\lambda_{max}$ is characteristic of the "strength" of the chromophore's electro-optic activity. For example, a $\Delta\lambda_{max}$ of ~30 nm or greater for a chromophore and its analog correlates to a sufficiently large $r_{33}$ value. Preferably, the $\Delta\lambda_{max}$ iS ~35 nm or greater.

Referring to FIG. 1, absorption of Chromophore (IU4128A) was measured in two different solvents. The concentration of the samples was 17 μg/mL in each solvent. $\lambda_{max}$ for Chromophore IU4128A is 653.45 nm in dichloromethane (DCM) and 622.40 nm in 1,4-dioxane.

Referring to FIG. 2, absorption of Chromophore (IV8422) was measured in two different solvents. The concentration of the samples was 17 μg/mL in each solvent. $\lambda_{max}$ for Chromophore IV8422 is 661.97 nm in dichloromethane (DCM) and 595.77 nm in 1,4-dioxane.

Referring to FIG. 3, absorption of Chromophore (KM4042) was measured in two different solvents. The concentration of the samples was 17 μg/mL in each solvent. $\lambda_{max}$ is 662 nm in dichloromethane (DCM) and $\lambda_{max}$ is 627 nm in 1,4-dioxane.

Referring to FIG. 4, absorption of Chromophore (KM4043) was measured in two different solvents. The concentration of the samples was 17 μg/mL in each solvent. $\lambda_{max}$ is 630 nm in dichloromethane (DCM) and $\lambda_{max}$ is 596 nm in 1,4-dioxane.

Referring to FIG. 5, absorption of Chromophore (KM4044) was measured in two different solvents. The concentration of the samples was 17 μg/mL in each solvent. $\lambda_{max}$ is 617 nm in dichloromethane (DCM) and $\lambda_{max}$ is 581 nm in 1,4-dioxane.

Referring to FIG. 6, absorption of Example 6 Chromophore (KM4051) was measured in two different solvents. The concentration of the samples was 17 μg/mL in each solvent. $\lambda_{max}$ is 661 nm in dichloromethane (DCM) and $\lambda_{max}$ is 626 nm in 1,4-dioxane.

Referring to FIG. 7, absorption of Chromophore (KM4060) was measured in two different solvents. The concentration of the samples was 14 μg/mL in 1,4-dioxane while the concentration of the samples was 8.5 μg/mL in dichloromethane (DCM). $\lambda_{max}$ is 631 nm in dichloromethane (DCM) and $\lambda_{max}$ is 595 nm in 1,4-dioxane.

Referring to FIG. 8, absorption of Chromophore (KM4084) was measured in two different solvents. The concentration of the samples was 17 μg/mL in each solvent. $\lambda_{max}$ is 627 nm in dichloromethane (DCM) and $\lambda_{max}$ is 593 nm in 1,4-dioxane.

$\lambda_{max}$ and $\Delta\lambda_{max}$ data of short chain bridge chromophores of FIGS. 1-8 is summarized as follows:

| Chromophore | $\lambda_{max}$ DCM | $\lambda_{max}$ 1,4-dioxane | $\Delta\lambda_{max}$ |
|---|---|---|---|
| IU4128A | 653 nm | 622 nm | 31 nm |
| IV8422 | 662 nm | 596 nm | 66 nm |
| KM4042 | 662 nm | 627 nm | 35 nm |
| KM4043 | 630 nm | 596 nm | 34 nm |
| KM4044 | 617 nm | 581 nm | 36 nm |
| KM4051 | 661 nm | 626 nm | 35 nm |
| KM4060 | 631 nm | 595 nm | 36 nm |
| KM4084 | 627 nm | 593 nm | 34 nm |

To generate a poling electric field, an electric potential is then applied to the electrodes while the material is heated to near its glass transition ($T_g$) temperature. After a suitable period of time, the temperature is gradually lowered while maintaining the poling electric field. Alternatively, the material can be poled by corona poling method, where an electrically charged needle at a suitable distance from the material film provides the poling electric field. In either instance, the dipoles in the material tend to align with the field. Various embodiments according to the present invention can include or can also include electro-optic materials having a material glass transition temperature greater than or equal to 100° C., greater than or equal to 125° C., or greater than or equal to 150° C., or even higher.

The nonlinear optical property of the poled material is then tested as follows. Polarized light, often from a laser, is passed through the poled material, then through a polarizing filter, and to a light intensity detector. If the intensity of light received at the detector changes as the electric potential applied to the electrodes is varied, the material incorporates a nonlinear optic chromophore having an electro-optically variable refractive index. A more detailed discussion of techniques to measure the electro-optic constants of a poled film that incorporates nonlinear optic chromophores may be found in Chia-Chi Teng, Measuring Electro-Optic Constants of a Poled Film, in Nonlinear Optics of Organic Molecules and Polymers, Chp. 7, 447-49 (Hari Singh Nalwa & Seizo Miyata eds., 1997), incorporated by reference in its entirety, except that in the event of any inconsistent disclosure or definition from the present application, the disclosure or definition herein shall be deemed to prevail.

The relationship between the change in applied electric potential versus the change in the refractive index of the material may be represented as its electro-optical (OE) coefficient ($r_{33}$). This effect is commonly referred to as an electro-optic, or EO, effect. Devices that include materials that change their refractive index in response to changes in an applied electric potential are called electro-optical (EO) devices. For compositions having short chain bridge chromophores described herein, a high EO coefficient of >30 pm/V (measured, e.g., at 980 nm) or >20 pm/V (measured at, e.g., 1310 nm) can be achieved.

Compositions having short chain bridge chromophores described herein can also exhibit decreased optical loss. Optical loss of various of the described embodiments can be <2 dB/cm. Moreover, compositions described herein may provide higher degree of transparency at wavelengths outside of the absorption bands of the various embodiments herein. In addition, compositions described herein can also exhibit exceptionally high thermal stability, characterized by a decomposition temperature greater than 250 C, as well as high photostability, measured by the degradation of photo-optic materials under broadband light and ambient conditions.

The second-order hyperpolarizability ($\gamma$) or third-order susceptibility ($\chi^{(3)}$), are the normal measures of third-order NLO activity. While there are several methods used to measure these properties, degenerate four-wave mixing (DFWM) is very common. See C. W. Thiel, "For-wave Mixing and Its Applications," www.physics.montana.edu.students.thiel.docs/FWMixing.pdf, the entire contents of which are hereby incorporated herein by reference. Referring to Published U.S. Patent Application No. US 2012/0267583A1, the entire contents of which are incorporated herein by reference, a method of evaluating third-order NLO properties of thin films, known in the art as Degenerate Four Wave Mixing (DFWM), can be used. In FIG. 4 of US 2012/0267583A1, Beams 1 and 2 are picosecond, coherent pulses, absorbed by the NLO film deposited on a glass substrate. Beam 3 is a weaker, slightly delayed beam at the same wavelength as Beams 1 and 2. Beam 4 is the resulting product of the wave mixing, diffracted off of the transient holographic grating, produced by interferences of beams 1 and 2 in the NLO material of the film. Beam 3 can be a "control" beam at a telecom wavelength which produces a "signal" beam at a frequency not absorbed by the NLO material.

Nonlinear optical chromophores suitable for use in accordance with the various embodiments of the invention include those having the general formula (I):

$$D\text{-}\Pi\text{-}A \qquad (I)$$

wherein D represents an organic electron-donating group; A represents an organic electron-accepting group having an electron affinity greater than the electron affinity of D; and Π represents a Π-bridge between A and D. The terms electron-donating group (donor or "D"), Π-bridge (bridging group or "Π"), and electron-accepting group (acceptor or "A"), and general synthetic methods for forming D-Π-A chromophores in accordance with the various embodiments described herein are known in the art, for example as described in U.S. Pat. Nos. 5,670,091, 5,679,763, 6,090,332, and 6,716,995, and U.S. patent application Ser. No. 17/358,960, filed on Jun. 25, 2021, the entire contents of each of which is incorporated herein by reference.

An acceptor is an atom or group of atoms that has a low reduction potential, wherein the atom or group of atoms can accept electrons from a donor through a H-bridge. The acceptor (A) has a higher electron affinity than does the donor (D), so that, at least in the absence of an external electric field, the chromophore is generally polarized in the ground state, with relatively more electron density on the acceptor (D). Typically, an acceptor group contains at least one electronegative heteroatom that is part of a pi bond (a double or triple bond) such that a resonance structure can be drawn that moves the electron pair of the pi bond to the heteroatom and concomitantly decreases the multiplicity of the pi bond (i.e., a double bond is formally converted to single bond or a triple bond is formally converted to a double bond) so that the heteroatom gains formal negative charge. The heteroatom may be part of a heterocyclic ring. Exemplary acceptor groups include but are not limited to —$NO_2$, —CN, —CHO, COR, $CO_2R$, —$PO(OR)_3$, ——SOR, —$SO_2R$, and —$SO_3R$ where R is alkyl, aryl, or heteroaryl. The total number of heteroatoms and carbons in an acceptor group is about 30, and the acceptor group may be substituted further with alkyl, aryl, and/or heteroaryl.

Suitable electron-accepting groups "A" (also referred to in the literature as electron-withdrawing groups) for nonlinear optical chromophores that can be used in accordance with the various embodiments of the present invention include those described in published U.S. Patent Applications: US 2007/0260062; US 2007/0260063; US 2008/0009620; US 2008/0139812; US 2009/0005561; US 2012/0267583A1 (collectively referred to as "the prior publications"), each of which is incorporated herein by reference in its entirety; and in U.S. Pat. Nos. 6,584,266; 6,393,190; 6,448,416; 6,44,830; 6,514,434; 5,044,725; 4,795,664; 5,247,042; 5,196,509; 4,810,338; 4,936,645; 4,767,169; 5,326,661; 5,187,234; 5,170,461; 5,133,037; 5,106,211; and 5,006,285; each of which is also incorporated herein by reference in its entirety.

In nonlinear optical chromophores suitable for use in accordance with various embodiments of the present invention, suitable electron-accepting groups can include those according to general formula (IP):

(II$^a$)

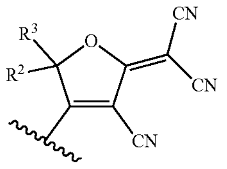

wherein $R^2$ and $R^3$ each independently represents a moiety selected from the group consisting of H, substituted or unsubstituted $C_1$-$C_{10}$alkyl, substituted or unsubstituted $C_2$-$C_{10}$ alkenyl, substituted or unsubstituted $C_2$-$C_{10}$ alkynyl, substituted or unsubstituted aryl, substituted or unsubstituted alkyl-aryl, substituted or unsubstituted carbocyclic, substituted or unsubstituted heterocyclic, substituted or unsubstituted cyclohexyl, and $(CH_2)_n$—O—$(CH_2)_n$ where n is 1-10. As used herein,

represents a point of bonding to another portion of a larger molecular structure. In various preferred embodiments, one or both of $R^2$ and $R^3$ represent a halogen-substituted moiety. Halogen-substituted may refer to mono-, di-, tri- and higher degrees of substitution. In various embodiments, one of $R^2$ and $R^3$ represent a halogen-substituted alkyl moiety and the other represents an aromatic moiety. In various embodiments, one of $R^2$ and $R^3$ represent a halogen-substituted aromatic moiety and the other represents an alkyl moiety. In various embodiments, the electron-accepting group can be

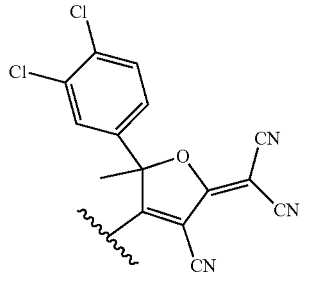 [SMILES: *C1=C(C#N)C(=C(C#N)C#N)OC1(C)c1ccc(Cl)c(Cl)c1]

In various embodiments, the electron-accepting group can be

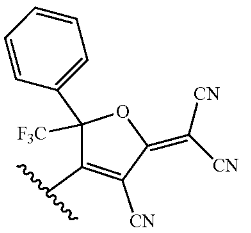 [SMILES: *C1=C(C#N)C(=C(C#N)C#N)OC1(c1ccccc1)C(F)(F)F]

In various embodiments, the electron-accepting group can be

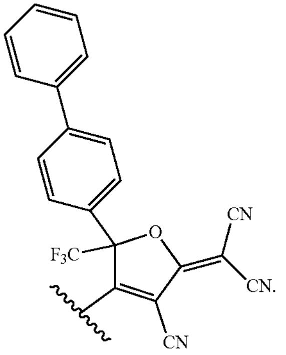 [SMILES: *C1=C(C#N)C(=C(C#N)C#N)OC1(c1ccc(-c2ccccc2)cc1)C(F)(F)F]

A donor includes an atom or group of atoms that has a low oxidation potential, wherein the atom or group of atoms can donate electrons to an acceptor "A" through a Π-bridge. The donor (D) has a lower electron affinity than does the acceptor (A), so that, at least in the absence of an external electric field, the chromophore is generally polarized, with relatively less electron density on the donor (D). Typically, a donor group contains at least one heteroatom that has a lone pair of electrons capable of being in conjugation with the p-orbitals of an atom directly attached to the heteroatom such that a resonance structure can be drawn that moves the lone pair of electrons into a bond with the p-orbital of the atom directly attached to the heteroatom to formally increase the multiplicity of the bond between the heteroatom and the atom directly attached to the heteroatom (i.e., a single bond is formally converted to double bond, or a double bond is formally converted to a triple bond) so that the heteroatom gains formal positive charge. The p-orbitals of the atom directly attached to the heteroatom may be vacant or part of a multiple bond to another atom other than the heteroatom. The heteroatom may be a substituent of an atom that has pi bonds or may be in a heterocyclic ring. Exemplary donor groups include but are not limited to $R_2N$— and $R_nX^1$—, where R is alkyl, aryl or heteroaryl, $X^1$ is O, S, P, Se, or Te, and n is 1 or 2. The total number of heteroatoms and carbons in a donor group may be about 30, and the donor group may be substituted further with alkyl, aryl, or heteroaryl.

Suitable electron-donating groups "D" for nonlinear optical chromophores that can be used in accordance with the various embodiments of the present invention include those described in published U.S. Patent Applications: US 2007/0260062; US 2007/0260063; US 2008/0009620; US 2008/0139812; US 2009/0005561; US 2012/0267583A1 (collectively referred to as "the prior publications"), each of which is incorporated herein by reference in its entirety; and in U.S. Pat. Nos. 6,584,266; 6,393,190; 6,448,416; 6,44,830; 6,514,434; 5,044,725; 4,795,664; 5,247,042; 5,196,509; 4,810,338; 4,936,645; 4,767,169; 5,326,661; 5,187,234; 5,170,461; 5,133,037; 5,106,211; and 5,006,285; as well as U.S. patent application Ser. No. 17/358,960, filed on Jun. 25, 2021; each of which is also incorporated herein by reference in its entirety.

In various embodiments, the electron-donating groups can include quinolinyl groups which may be substituted or unsubstituted, including hydro and alkyl substituents, aryl substituents and combinations thereof. Such quinolinyl groups may have one or more diamondoid groups covalently attached thereto. For example, the electron-donating groups can include alkoxyphenyl substituted quinolones such as, for example:

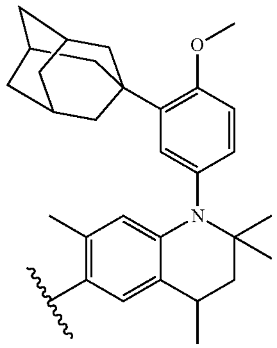

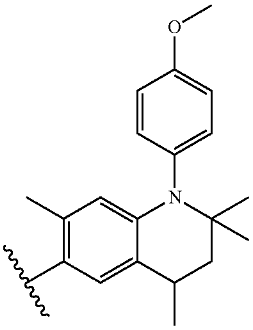

-continued

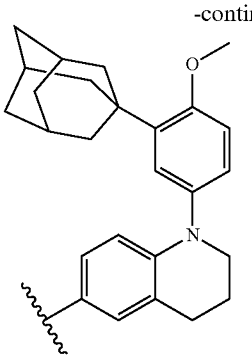

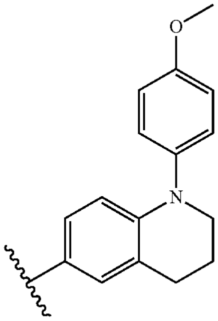

;

for example, aromatic nitrogen containing groups such as:

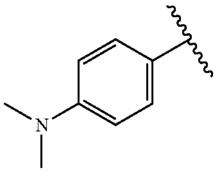

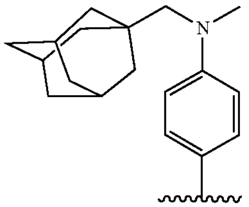

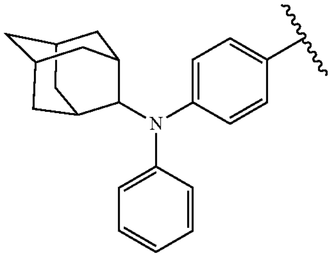

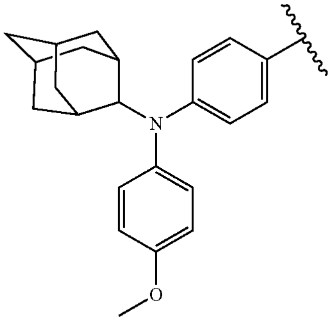

.

A "Π-bridge" includes an atom or group of atoms through which electrons may be delocalized from an electron donor (defined above) to an electron acceptor (defined above) through the orbitals of atoms in the bridge. Typically, the orbitals will be p-orbitals on double ($sp^2$) or triple (sp) bonded carbon atoms such as those found in alkenes, alkynes, neutral or charged aromatic rings, and neutral or charged heteroaromatic ring systems. Additionally, the orbitals may be p-orbitals on atoms such as boron or nitrogen. Additionally, the orbitals may be p, d or f organometallic orbitals or hybrid organometallic orbitals. The atoms of the bridge that contain the orbitals through which the electrons are delocalized are referred to here as the "critical atoms." The number of critical atoms in a bridge may be a number from 1 to about 30. The critical atoms may be substituted with an organic or inorganic group. The substituent may be selected with a view to improving the solubility of the chromophore in a polymer matrix, to enhancing the stability of the chromophore, or for other purpose.

In accordance with various embodiments of the nonlinear optical chromophores disclosed herein, the Π-bridge includes a carbon chain separating the electron-donating group and the electron-accepting group, wherein the length of the chain separating the two is from 2 to 4 carbons atoms. The Π-bridge may further include one or more pendant substituents, the atoms of which are not included in the chain length count. In various embodiments, two or more pendant substituents can form a ring structure with the 2 to 4 carbon atom bridge. For example, the Π-bridge in nonlinear optical chromophores in accordance with various embodiments of the present invention can include structures according to the general formula ($I^a$)-($I^h$), wherein A, D, x and each R are as defined herein above:

($I^a$)

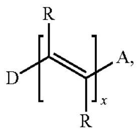

($I^b$)

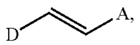

($I^c$)

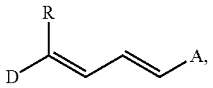

($I^d$)

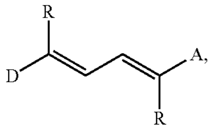

($I^e$)

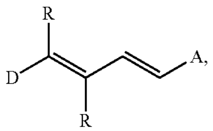

($I^f$)

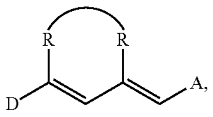

($I^g$)

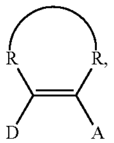 and

-continued ($I^h$)

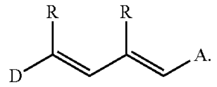

Nonlinear optical chromophores in accordance with various embodiments of the present invention exhibit maximum absorption ($\lambda_{max}$) of ≤800 nm. Nonlinear optical chromophores in accordance with various embodiments of the present invention exhibit excellent second order optical properties, and have excellent thermal stability. Nonlinear optical chromophores in accordance with various embodiments of the present invention can be used in admixture with one or more host polymers or matrix materials, and/or one or more solvents, or can be used neat (i.e., no host polymer or solvent). Nonlinear optical chromophores in accordance with various embodiments of the present invention exhibit can be formed into thin films for electro-optic devices and poled in accordance with a variety of processes known in the art for producing ordered thin films.

The invention will now be described in further detail with reference to the following non-limiting example.

EXAMPLES

Example 1: Chromophore IU4128A

Synthesis of triphenyl(p-tolyl)silane:

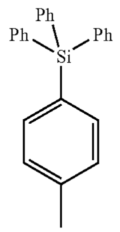

A dry RB flask (1) was charged with 1-bromo-4-methylbenzene (9.93 mL, 0.0807 mol) and THF (200 mL) then chilled to −78° C. in a dry ice/acetone bath. n-Butyllithium (2.50 mol/L, 32.3 mL, 0.0807 mol) was added at a rate so the temperature did not rise above −55° C. (5 mL increments), and the reaction was stirred under nitrogen at −78° C. for 2 hours.

Another RB flask (2) was evacuated then filled with nitrogen 3 times, charged with triphenylsilyl chloride (26.2 g, 0.0888 mol), evacuated/filled with nitrogen 3 times, and stirred at 60° C. under vacuum for 1H. The flask (2) was allowed to cool, filled with nitrogen, then charged with THF (100 mL) and chilled to −78° C.

The contents of flask 2 were cannulated into flask 1 at a steady drip, temperature increased 5° C. The reaction was stirred under nitrogen and allowed to slowly warm to room temperature.

The reaction was diluted with DCM, washed with water then brine, dried with $MgSO_4$ and evaporated giving a white solid. It was stirred in hexane for 1H, filtered/washed with hexane (500 mL).

Obtained triphenyl(p-tolyl)silane (25.4 g, 0.0725 mol, yield: 89.8%) as a white powder.

Wohl-Ziegler Bromination of Triphenyl(p-tolyl)silane:

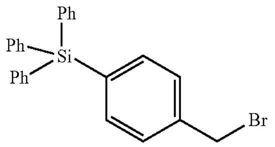

An RB flask was charged with the triphenyl(p-tolyl)silane (0 mmol/L, 0 mL, 0.0394 mol), N-bromosuccinimide (7.36 g, 0.0413 mol), 400 mL of DCM, and 2-[E)-(1-cyano-1-methyl-ethyl)azo]-2-methyl-propanenitrile (0.323 g, 0.00197 mol). The reaction was refluxed under nitrogen overnight. TLC indicated quantitative conversion to the bromide. The reaction was washed with water then brine, dried with MgSO4, and evaporated giving a tan powder. This was triturated in hexane and filtered giving a first fraction, 13.8 g, and the filtrate was evaporated giving a second fraction, 3.49 g. The hexane fraction was chromatographed, eluting with hexane/ethyl acetate (3-5%). The appropriate fractions were combined and evaporated resulting in a very white granular powder, 885 mg.

Obtained [4-(bromomethyl)phenyl]-triphenyl-silane (14.7 g, 0.0342 mol, yield: 87.0%).

Alkylation of 2,2,4,7-tetramethyl-3,4-dihydro-1H-quinoline:

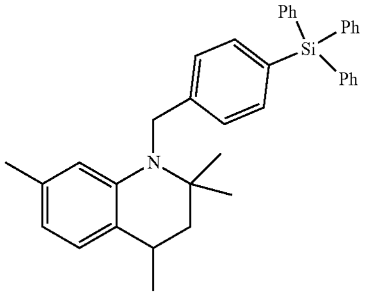 [SMILES: Cc1ccc2c(c1)N(Cc1ccc([Si](c3ccccc3)(c3ccccc3)c3ccccc3)cc1)C(C)(C)CC2C]

An RB flask was charged with [4-(bromomethyl)phenyl]-triphenyl-silane (13.8 g, 0.0321 mol), 2,2,4,7-tetramethyl-3,4-dihydro-1H-quinoline (6.08 g, 0.0321 mol), and 200 mL DMF under nitrogen. The mixture was chilled to 0° C. then sodium hydride (60.0%, 1.41 g, 0.0353 mol) was added. The reaction was stirred under nitrogen, slowly warming to RT. At 2H the reaction had warmed up and it was homogeneous, about 15 minutes later the product crashed out and it stopped stirring. The reaction became a solid-looking white paste.

The reaction was triturated in water then filtered/washed with water. The organics were chromatographed, eluting with hexane/ethyl acetate (5%). The appropriate fractions were combined and evaporated giving an off white solid. It was dissolved in DCM, hexane was added and the DCM was evaporated off. The resulting solids were filtered.

Obtained triphenyl-[4[(2,2,4,7-tetramethyl-3,4-dihydro-quinolin yl)methyl]phenyl]silane (10.86 g, 0.0202 mol, yield: 63.0%).

Vilsmeier-Haack formylation of triphenyl-[4-[(2,2,4,7-tetramethyl-3,4-dihydroquinolin-1-yl)methyl]phenyl]silane:

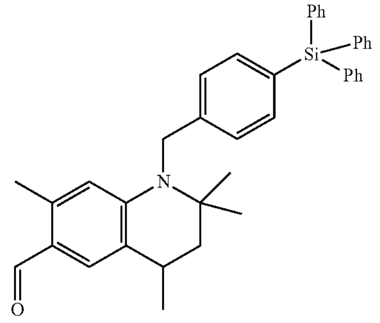 [SMILES: Cc1cc2c(cc1C=O)C(C)CC(C)(C)N2Cc1ccc([Si](c2ccccc2)(c2ccccc2)c2ccccc2)cc1]

A round bottom flask was charged with 200 mL DCM, N,N-Dimethylformamide (3.69 mL, 0.0479 mol), and POC13 (4.04 mL, 0.0442 mol) under nitrogen. The reaction was stirred for one hour, then the quinoline (dissolved in an additional 200 mL DCM) was added via drop funnel at a fast drop rate to the reaction. The mixture was stirred at room temperature for 16 hr then at 32° C. for another 24 hr. The reaction mixture was cooled to room temperature, then 10% sodium carbonate was added, and the reaction was stirred vigorously for 1 hour. The phases were separated, and the organics were dried over anhydrous $MgSO_4$. The material was purified by elution through a silica gel column (DCM was used as eluent). The appropriate fractions were combined and concentrated. The resultant material was triturated in hexane, filtered, and dried.

Obtained 2,2,4,7-tetramethyl-1-[(4-triphenylsilylphenyl)methyl]-3,4-dihydroquinoline-6-carbaldehyde (18.9 g, 0.0334 mol, yield: 90.7%) as a bluish-white powder.

Knoevenagel Condensation:

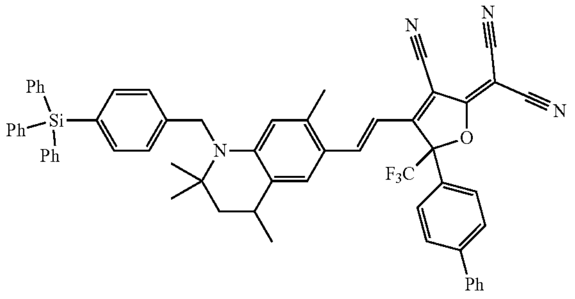 [SMILES: Cc1cc2c(cc1/C=C/C1=C(C#N)C(=C(C#N)C#N)OC1(c1ccc(-c3ccccc3)cc1)C(F)(F)F)C(C)CC(C)(C)N2Cc1ccc([Si](c2ccccc2)(c2ccccc2)c2ccccc2)cc1]

A round bottom flask was charged with 2,2,4,7-tetramethyl-1-[(4-triphenylsilylphenyl)methyl]-3,4-dihydroquinoline-6-carbaldehyde (1.00 g, 0.00177 mol), 2-[3-cyano-4-methyl-5-(4-phenylphenyl)-5-(trifluoromethyl)-2-furylidene]propanedinitrile (0.692 g, 0.00177 mol), 1-propanol (10.0 mL) and acetic acid (1.01 mL, 0.0177 mol). The reaction was sealed and stirred at 80° C. for 16 hr. The reaction mixture was removed from the heat and evaporated. The residue was purified by normal-phase chromatography (eluting with 15-30% EtOAc in hexanes). The appropriate fractions were combined and evaporated giving a colorful film. This was dissolved in DCM and crystallized over night by evaporation.

Obtained 2-[3-cyano-5-(4-phenylphenyl)-4-[(E)-2-[2,2,4,7-tetramethyl-1-[(4-triphenylsilylphenyl)methyl]-3,4-dihydroquinolin-6-yl]vinyl]-5-(trifluoromethyl)-2-furylidene] propanedinitrile (1.12 g, 0.00119 mol, yield: 67.5%).

Example 2: Chromophore IV8422

Buchwald Coupling of 1,2,3,4-tetrahydroquinoline with 1-(5-bromo-2-methoxy-phenyl)adamantane:

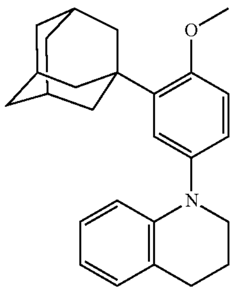 [SMILES: COc1ccc(N2CCCc3ccccc32)cc1C12CC3CC(CC(C3)C1)C2]

A solution of 1,2,3,4-tetrahydroquinoline (2.00 g, 0.0150 mol) and 1-(5-bromo-2-methoxy-phenyl)adamantane (97.0%, 5.22 g, 0.0158 mol) in 50 mL of toluene was sparged with $N_2$ then treated with potassium tert-butoxide (2.19 g, 0.0195 mol), $Pd(OAc)_2$ (0.135 g, 0.000601 mol), and tri-tert-butylphosphine (0.243 g, 0.00120 mol). The flask was fitted with a condenser, and the reaction mixture was heated to 115° C. overnight. The reaction mixture was concentrated then diluted with 1:1 DCM/hexanes. The solids were removed by vacuum filtration. The filtrate was concentrated then diluted with MeOH. Beige solids precipitated from the solution. The solids were isolated then again soaked in MeOH (x2). The solids were isolated and dried by vacuum filtration, then the solids were soaked in Et2O (x3). The solids were isolated and dried by vacuum filtration then dried in the air over the weekend.

Obtained 1-[3-(1-adamantyl)-4-methoxy-phenyl]-3,4-dihydro-2H-quinoline (96.0%, 5.25 g, 0.0135 mol, yield: 89.8%) as a tan solid.

Vilsmeier-Haack Formylation of 1-[3-(1-adamantyl)-4-methoxy-phenyl]-3,4-dihydro-2H-quinoline:

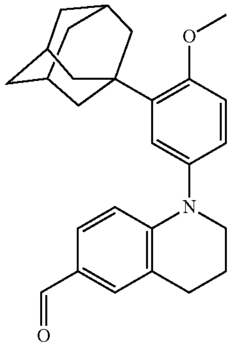 [SMILES: COc1ccc(N2CCCc3cc(C=O)ccc32)cc1C12CC3CC(CC(C3)C1)C2]

A suspension of 1-[3-(1-adamantyl)-4-methoxy-phenyl]-3,4-dihydro-2H-quinoline (96.0%, 4.00 g, 0.0103 mol) and N,N-Dimethylformamide (3.98 mL, 0.0514 mol) in DCM (50 mL) was sparged with $N_2$ then treated with dropwise addition of POC13 (3.76 mL, 0.0411 mol). The mixture was stirred at room temperature. It quickly turned olive green, then after 20 min, it was a dark amber color. After 35 min, LCMS analysis indicated >99% conversion to the iminium and aldehyde. The reaction was quenched by pouring into an icy solution of 10% Na2CO3. The mixture was diluted with DCM and stirred vigorously overnight. The DCM had evaporated, leaving the aqueous with a large amount of precipitated solid. The solid was collected by vacuum filtration, and LCMS analysis indicated full hydrolysis to the aldehyde. The solids were triturated with Et2O (twice) then isolated and dried under vacuum.

Obtained 1-[3-(1-adamantyl)-4-methoxy-phenyl]-3,4-dihydro-2H-quinoline-6-carbaldehyde (98.0%, 4.45 g, 0.0109 mol, yield: 106%) as a tan solid.

Wittig Condensation of 1-[3-(1-adamantyl)-4-methoxy-phenyl]-3,4-dihydro-2H-quinoline-6-carbaldehyde with Thiophene Phosphonium Bromide:

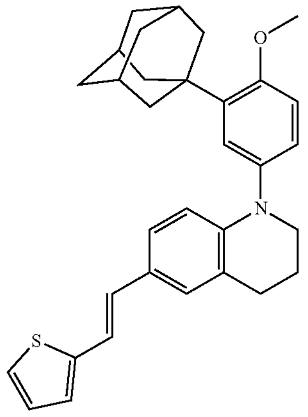 [SMILES: COc1ccc(N2CCCc3cc(/C=C/c4cccs4)ccc32)cc1C12CC3CC(CC(C3)C1)C2]

A solution of triphenyl(2-thienylmethyl)phosphonium bromide (9.74 g, 0.0222 mol) in THF (250 mL) was treated with potassium tert-butoxide (2.49 g, 0.0222 mol). The mixture turned reddish-orange immediately. After 10 min, 1-[3-(1-adamantyl)-4-methoxy-phenyl]-3,4-dihydro-2H-quinoline-6-carbaldehyde (4.45 g, 0.0111 mol) was added portion-wise. The flask was capped, and the reaction mixture stirred at rt. It turned from reddish-orange to deep red almost immediately. LCMS analysis after 2 hr indicated full conversion. The mixture was concentrated, then the residue was taken up in Et2O. The solids were removed by filtration, and the filtrate was concentrated. The material was purified by normal-phase chromatography (15% EtOAc in hexanes). The product fractions were concentrated.

Obtained 1-[3-(1-adamantyl)-4-methoxy-phenyl]-6-[(E)-2-(2-thienyl)vinyl]-3,4-dihydro-2H-quinoline (87.0%, 5.01 g, 0.00906 mol, yield: 81.7%) as a bright yellow film.

Vilsmeier-Haack Formylation of 1-[3-(1-adamantyl)-4-methoxy-phenyl]-6-[(E)-2-(2-thienyl)vinyl]-3,4-dihydro-2H-quinoline

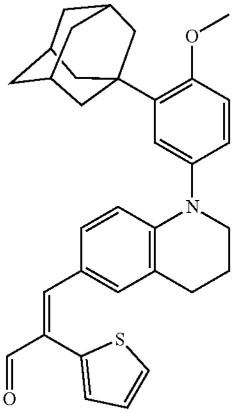 [SMILES: COc1ccc(N2CCCc3cc(/C=C(/C=O)c4cccs4)ccc32)cc1C12CC3CC(CC(C3)C1)C2]

A solution of 1-[3-(1-adamantyl)-4-methoxy-phenyl]-6-[(E)-2-(2-thienyl)vinyl]-3,4-dihydro-2H-quinoline (87.0%, 5.01 g, 0.00906 mol) and DMF (3.51 mL, 0.0453 mol) in DCM (250 mL) was sparged with $N_2$ then treated with dropwise addition of $POCl_3$ (1.04 mL, 0.0113 mol). The bright yellow mixture was stirred at room temperature overnight. The reaction was quenched by pouring into an icy solution of 10% $Na_2CO_3$. The mixture was diluted with DCM and stirred vigorously over 96 hr. The DCM had evaporated, leaving the aqueous with a large amount of precipitated solid. The solid was collected by vacuum filtration. The solids were taken up in Et2O then purified by NP chromatography (20% EtOAc in hexanes). The product fractions were concentrated.

Obtained (Z)-3-[1-[3-(1-adamantyl)-4-methoxy-phenyl]-3,4-dihydro-2H-quinolin-6-yl]-2-(2-thienyl)prop-2-enal (96.4%, 2.81 g, 0.00531 mol, yield: 58.7%) as a bright orange solid.

Knoevenagel Condensation of (Z)-3-[1-[3-(1-adamantyl)-4-methoxy-phenyl]-3,4-dihydro-2H-quinolin-6-yl]-2-(2-thienyl)prop-2-enal with 2-(3-cyano-4,5,5-trimethyl-2-furylidene)propanedinitrile:

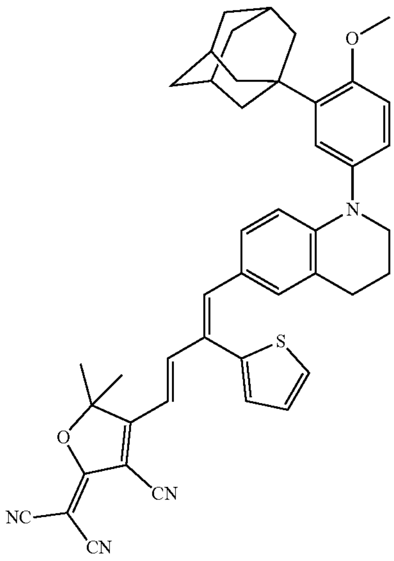 [SMILES: COc1ccc(N2CCCc3cc(/C=C(/C=C/C4=C(C#N)C(=C(C#N)C#N)OC4(C)C)c4cccs4)ccc32)cc1C12CC3CC(CC(C3)C1)C2]

A suspension of (Z)-3-[1-[3-(1-adamantyl)-4-methoxy-phenyl]-3,4-dihydro-2H-quinolin-6-yl]-2-(2-thienyl)prop-2-enal (96.4%, 1.00 g, 0.00189 mol) in 50 mL of EtOH was treated with 2-(3-cyano-4,5,5-trimethyl-2-furylidene)propanedinitrile (0.414 g, 0.00208 mol). The flask was sealed with a septum, and the mixture was stirred at 60° C. for 120 hr. The heat was then increased to 95C for another 48 hr. The reaction mixture was concentrated then purified by normal-phase chromatography (50-100% DCM in hexanes). The product fractions were concentrated, then the residue was recrystallized from DCM/MeOH.

Obtained 2-[4-[(1E,3Z)-4-[1-[3-(1-adamantyl)-4-methoxy-phenyl]-3,4-dihydro-2H-quinolin-6-yl]-3-(2-thienyl)buta-1,3-dienyl]-3-cyano-5,5-dimethyl-2-furylidene] propanedinitrile (0.472 g, 0.000683 mol, yield: 36.1%) as a green powder.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A composition for preparing an electro-optic film exhibiting one or more optimized optic characteristics, the composition comprising a nonlinear optical chromophore and a polar solvent, wherein the nonlinear optical chromophore has a general formula (I):

$$D\text{-}\Pi\text{-}A \qquad (I)$$

wherein D represents an organic electron-donating group; A represents an organic electron-accepting group having an electron affinity greater than the electron affinity of D; and Π represents a Π-bridge between A and D;

wherein the Π-bridge comprises a carbon chain covalently bound to and separating A and D, wherein the carbon chain between A and D is 2 to 4 carbon atoms, and wherein the 2 to 4 carbon atom chain comprises up to 2 carbon-carbon double bonds and up to 4 pendant substituents; and wherein the organic electron-denoating group is a substituted or unsubstituted tetrahydroquinoline group;

wherein the polar solvent is adapted to promote high material hyperpolarizability in the electro-optic film, wherein the high material hyperpolarizability is characterized by an electro-optic coefficient of 20 pm/V or greater when measured at a wavelength greater than or equal to 1000 nm;

wherein the nonlinear optical chromophore exhibits a λmax value less than or equal to 800 nm, and wherein the nonlinear optical chromophore exhibits a $\Delta\lambda_{max}$ value greater than or equal to 30 nm compared to an analog in a nonpolar solvent.

2. The composition according to claim 1, wherein the nonlinear optical chromophore exhibits a level of transparency at a wavelength greater than 800 nm.

3. The composition according to claim 1, wherein the composition has a glass transition temperature of 100° C. or above.

4. The composition according to claim 1, wherein the composition has an optic loss, less than 2 dB/cm.

5. The composition according to claim 1, wherein the composition has a decomposition temperature greater than 250° C.

6. The composition according to claim 1, wherein the nonlinear optical chromophore comprises a nonlinear optical chromophore of a general formula (Ia):

(Ia)

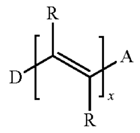

wherein D represents an organic electron-donating group; A represents an organic electron-accepting group having an electron affinity greater than the electron affinity of D; x is 1 or 2; and wherein each R independently represents a hydrogen, an alkyl group, aryl group, sulfur or oxygen linked alkyl or aryl group, an aryl group linked directly by a carbon-carbon bond, a halogen, a halogenated alkyl group, a halogenated aryl group, a branched or unbranched, optionally heteroatom-containing $C_1$-$C_4$ substituent, or a diamondoid-containing group.

7. The composition according to claim 6, wherein the substituted or unsubstituted tetrahydroquinoline group is selected from the group consisting of

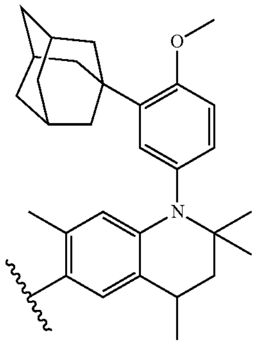

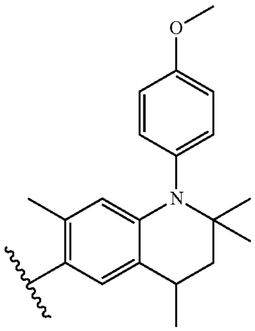

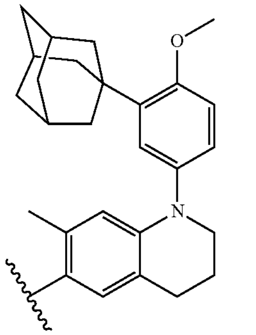

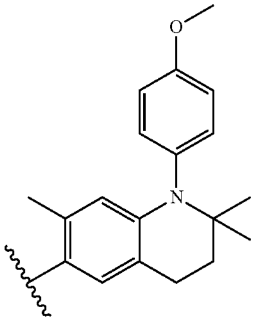

and

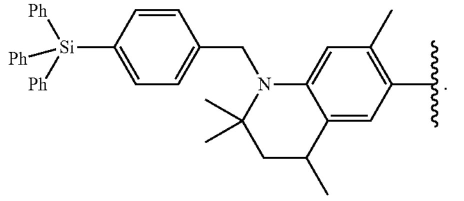

8. The composition according to claim 6, wherein at least one R group represents a thiophene.

9. The composition according to claim 6, wherein x is 2, and wherein at least one R group represents a thiophene.

10. The composition according to claim 6, wherein x is 1, and wherein each R represents hydrogen.

11. The composition according to claim 1, wherein the nonlinear optical chromophore comprises a nonlinear optical chromophore having a general formula:

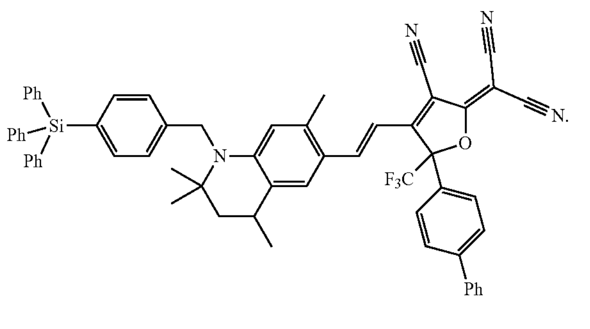

12. The composition according to claim 1, wherein the nonlinear optical chromophore comprises a nonlinear optical chromophore having a general formula:

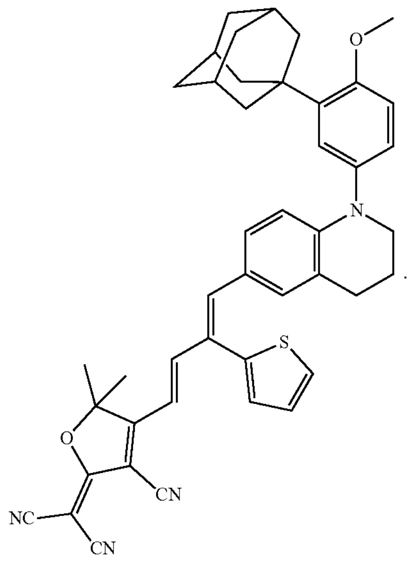

13. A composition for preparing an electro-optic film exhibiting one or more optimized optic characteristics, the composition comprising a nonlinear optical chromophore and a polar solvent, wherein the nonlinear optical chromophore has a general formula (I):

$$D\text{-}\Pi\text{-}A \quad (I)$$

wherein D represents an organic electron-donating group; A represents an organic electron-accepting group having an electron affinity greater than the electron affinity of D; and Π represents a Π- bridge between A and D;

wherein the Π-bridge comprises a carbon chain covalently bound to and separating A and D, wherein the carbon chain between A and D is 2 to 4 carbon atoms, and wherein the 2 to 4 carbon atom chain comprises up to 2 carbon-carbon double bonds and up to 4 pendant substituents; and wherein the polar solvent is a dichloromethane (DCM) solvent adapted to promote high material hyperpolarizability in the electro-optic film, wherein the high material hyperpolarizability is characterized by an electro-optic coefficient of 20 pm/V or greater when measured at a wavelength greater than or equal to 1000 nm;

wherein the nonlinear optical chromophore exhibits a λmax value less than or equal to 800 nm, and wherein the nonlinear optical chromophore exhibits a $\Delta\lambda_{max}$ value greater than or equal to 30 nm compared to an analog in a nonpolar solvent.

* * * * *